United States Patent
Yoshida et al.

(10) Patent No.: US 6,395,209 B2
(45) Date of Patent: *May 28, 2002

(54) DEPOSITED PLASTIC FILM

(75) Inventors: Shigenobu Yoshida, Ushiku; Yuzou Otani, Shiga-ken, both of (JP)

(73) Assignees: Mitsubishi Chemical Corporation; Mitsubishi Polyester Film Corporation, both of Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,788

(22) Filed: Sep. 24, 1998

(30) Foreign Application Priority Data

Sep. 25, 1997 (JP) .............................. 9-278156

(51) Int. Cl.⁷ ............................ B29C 67/00; B32B 15/08
(52) U.S. Cl. .................... 264/137; 264/235.8; 427/532; 427/541; 427/543; 427/544; 427/545; 427/546; 428/423.5; 428/423.7; 428/424.4; 428/424.8; 428/425.8; 428/451; 428/463; 428/480; 428/483; 428/475.2; 428/476.3; 428/520; 428/522
(58) Field of Search ............................... 428/411.1, 457, 428/458, 461, 474.4, 500, 688, 689, 702, 423.7, 423.5, 424.4, 424.8, 425.8, 463, 480, 483, 475.2, 476.3, 520, 522, 451; 427/532, 541, 543, 544, 545, 546; 264/137, 235.8

(56) References Cited

U.S. PATENT DOCUMENTS

| | | | |
|---|---|---|---|
| 5,100,720 A | | 3/1992 | Sawada et al. ............. 428/215 |
| 5,225,130 A | * | 7/1993 | Deiringer ................... 264/102 |
| 5,853,890 A | * | 12/1998 | Odawa et al. ............. 428/412 |
| 5,939,205 A | * | 8/1999 | Yokoyama et al. ....... 428/474.4 |
| 5,981,029 A | * | 11/1999 | Harada et al. ............. 428/143 |

FOREIGN PATENT DOCUMENTS

| | | |
|---|---|---|
| EP | 0 611 095 A1 | 8/1994 |
| JP | 6-39548 | 5/1994 |
| JP | 06-293838 | 10/1994 |
| JP | 6-293839 | 10/1994 |
| JP | 7-242758 | 9/1995 |
| JP | 8-2979 | 1/1996 |
| JP | 09-011427 | 1/1997 |
| JP | 09-039181 | 2/1997 |
| JP | 9-11427 | 9/1997 |

OTHER PUBLICATIONS

XP–002122753, Database WPI, Section CH, Week 199716, Derwent Publications, Ltd.
XP–002122754, Database WPI, Section CH, Week 199324, Derwent Publications, Ltd.
XP–002122755, Database WPI, Section CH, Week 199349, Derwent Publications, Ltd.
XP–002122756, Database WPI, Section CH, Week 199336, Derwent Publications, Ltd.

* cited by examiner

Primary Examiner—D. S. Nakarani
(74) Attorney, Agent, or Firm—David G. Conlin; Lisa Swiszcz Hazzard; Edwards & Angell, LLP

(57) ABSTRACT

The present invention relates to a deposited plastic film comprising:
  a deposited plastic film comprising:
    a plastic film;
    a coating layer which is formed on at least one surface of said plastic film and comprises a cured resin composition obtained by curing a resin composition comprising 6 to 80% by weight of an oxazoline group-containing water-soluble polymer; and
    a deposit layer which comprises a metal, metal oxide or mixture thereof and is formed on a surface of said coating layer.

10 Claims, No Drawings

DEPOSITED PLASTIC FILM

BACKGROUND OF THE INVENTION

The present invention relates to a deposited plastic film. More particularly, the present invention relates to a deposited plastic film having a thin layer comprising metal or metal oxide, which films are excellent in adhesion property and gas-barrier property after boiling treatment.

Deposited plastic films having a thin layer comprising metal or metal oxide (hereinafter occasionally referred to merely as "deposited film") have been used in extensive applications because these films can exhibit various useful properties such as gas-barrier property, visible light- or ultraviolet light-shielding property, heat ray-reflecting property, electrical conductivity,,transparent conductive property, magnetically recording property or the like by selecting appropriate metal and/or metal oxide as a material deposited on the film. For example, the deposited films have been applied to wrapping or packaging materials, decorative materials, shielding materials for window glass, materials for gold and silver threads, capacitor materials, display materials, materials for wiring boards, magnetic recording materials or the like. Further, in recent years, there has been intense attention to the application of such deposited films to a part of a transparent conductive sheet used in liquid crystal display devices, solar batteries, electromagnetic shielding panels, touch panels, electroluminescent (EL) panels, color filters or the like.

However, the deposited film tends to suffer from partial separation of a deposit layer formed thereon, especially during production thereof or when contacted with water, so that the properties of the deposited film, such as gas-barrier property are deteriorated.

Conventionally, it is known that in order to prevent the deposited film from being deteriorated in gas-barrier property, a coating layer (undercoat layer) comprising various polyurethanes, various polyesters or a mixture of polyurethane and polyester is formed between a base polyester film and a deposit layer of the deposited film (for example, Japanese Patent Application Laid-Open (KOKAI) No. 2-50837). Further, in order to improve water-resistance of adhesion property and solvent resistance of the deposited films, it has been proposed to apply a coating solution containing specific polyurethane, polyester and epoxy compound thereon (Japanese Patent Application Laid-Open (KOKAI) No. 4-176858).

However, many of the conventional deposited films have been still unsatisfactory in water resistance (hot water resistance) and solvent resistance under high-temperature conditions. Therefore, for instance, in the case where food is wrapped or packaged by a deposited polyester film which tends to be most ordinarily used for this purpose, there arises a problem that the deposited film cannot exhibit a sufficient gas-barrier property after subjected to boiling treatment or printed with solvent-based ink. Especially, deposited polyester films produced by reuse of polyester film chips have such a disadvantage that gas-barrier property thereof is considerably deteriorated. Further, in association with the spread of application fields of deposited polyester films, it has been demanded to provide deposited polyester films having a higher adhesion property or a high-reliable gas-barrier property.

In addition, a coating layer used as an anchor coat may be formed on a base polyester film either after completion of the film-forming process or by in-line coating method during the film-forming process. For example, in the production of biaxially stretched films, after a coating material constituting the anchor coat is applied onto a uniaxially stretched film, the dried or undried coated film is further stretched in transverse direction and then heat-treated. This method enables film formation, coating and drying to be conducted simultaneously, so that it has been expected to considerably reduce the production cost of the films. However, as a base film for deposited films, there is no suitable film on which a coating layer formed by the above-mentioned in-line coating method. In the case where the conventional film is used as a base film, the resultant deposited film is less satisfactory in solvent resistance and hot water resistance than those produced by ordinary methods, thereby causing a problem that a gas-barrier property of the film is considerably deteriorated after printing or after hot water treatments such as boiling and retorting.

As a result of the present inventors' earnest studies for solving the above-mentioned problems, it has been found that by using a coating solution containing specific resins, there can be obtained a deposited plastic film having excellent properties. The present invention has been attained on the basis of this finding.

SUMMARY OF THE INVENTION

It is an object of the present invention to provide a deposited plastic film having an excellent adhesion property between a base film and a deposit layer, and an excellent gas-barrier property after boiling treatment or printing.

To attain the aim, in a first aspect of the present invention, there is provided a deposited plastic film comprising:

a plastic film;

a coating layer which is formed on at least one surface of said plastic film and comprises a cured resin composition obtained by curing resin composition comprising 6 to 80% by weight of an oxazoline group-containing water-soluble polymer; and a deposit layer which comprises a metal, metal oxide or mixture thereof and is formed on a surface of said coating layer.

DETAILED DESCRIPTION OF THE INVENTION

The present invention is described in detail below.

As raw materials for the plastic film as a base film of the deposited plastic film according to the present invention, any plastic materials preferable for forming films can be used without particular limitations. Specific examples of the raw materials for the plastic film may include polyolefins such as homopolymers or copolymers of ethylene, propylene, butene or the like; amorphous polyolefins such as cyclic polyolefins; polyester-based resins such as polyethylene terephthalate or polyethylene-2,6-naphthalate; polyamides such as nylon 6, nylon 12 or copolymerized nylons; polyvinyl alcohol; partially hydrolyzed products of ethylene-vinyl acetate copolymer (EVOH); polyimides; polyether imides; polysulfones; polyether sulfones; polyether ether ketones; polycarbonates (PC); polyvinyl butyral; polyacrylates; ethylene-ethylene tetrafluoride copolymers; ethylene chloride trifluoride; ethylene tetrafluoride-perfluoroalkyl vinyl ether copolymers; polyvinylidene fluoride; polyvinyl fluoride; fluorocarbon resins such as perfluoroethylene-perfluoropropylene-perfluorovinyl ether terpolymers; resin compositions composed of acrylate compounds containing radical-reactive unsaturated groups; resin compositions composed of these acrylate compounds and thiol-containing mercapto compounds; photocurable resins, e.g., resin compositions obtained by melting oligomers such as epoxy acrylate, urethane acrylate, polyester acrylate or polyether acrylate in polyfunctional acrylate monomers; or a mixture thereof. Among these compounds, polyesters, polypropylene, polyamides, polyvinyl alcohol and partially hydrolyzed products of ethylene-vinyl acetate copolymer are preferred, and polyesters are more preferred.

As the polyesters preferable as a raw material of the plastic film according to the present invention, there may be exemplified polyethylene terephthalate comprising not less than 80 mol % of ethylene terephthalate units, polyethylene naphthalate comprising not less than 80 mol % of ethylene naphthalate units, poly-1,4-cyclohexane dimethylene terephthalate comprising not less than 80 mol % of 1,4-cyclohexane dimethylene terephthalate units, or the like.

In addition, as copolymerizing components of the polyesters other than the above-mentioned components, there may be used diols such as diethylene glycol, propylene glycol, neopentyl glycol, polyethylene glycol or polytetramethylene glycol; dicarboxylic acids such as isophthalic acid, 2,6-naphthalene dicarboxylic acid, 5-sodium-sulfo-isophthalic acid, adipic acid, azelaic acid, sebacic acid or ester-forming derivatives of these acids; oxymonocarboxylic acids such as oxybenzoic acid or ester-forming derivatives thereof; or the like.

In order to form protrusions on the surface of the film, the plastic film used in the present invention may further contain added particles, precipitated particles, catalyst residues or the like as an additive in such an amount ordinarily used by those skilled in the art, according to applications or uses thereof. Further, as additives other than the above-mentioned particles used for forming protrusions on the surface of the film, there may be used anti-static agents, stabilizers, lubricants, cross-linking agents, anti-blocking agents, anti-oxidants, colorants, light-shielding agents, ultraviolet light absorbing agents or the like, if necessary.

As the raw materials of the plastic film according to the present invention, reclaimed materials, e.g., reclaimed polyester obtained by processing scrap films resulting from the production of polyester films into chips, may also be used from the standpoint of saving resources. The amount of such reclaimed polyester used is not particularly restricted, but is preferably in the range of 10 to 100% by weight based on the total weight of polyester used.

In the present invention, it is required that the coating layer comprises a cured resin composition (including a cured resin) and further, the cured resin composition is obtained by curing a resin composition which contains 6 to 80% by weight of an oxazoline group-containing water-soluble polymer based on the weight of the resin composition. As such resin composition, there may be used, for example, a resin composition comprising 10 to 80% by weight of the oxazoline group-containing water-soluble polymer, 10 to 80% by weight of a water-compatible acrylic resin and 10 to 70% by weight of a water-compatible polyurethane-based resin.

The above-mentioned oxazoline group-containing water-soluble polymer may include those polymers obtained by polymerizing (a) an addition-polymerizable oxazoline represented by any of the following general formulae (I) to (III), if required with (b) at least one other monomer.

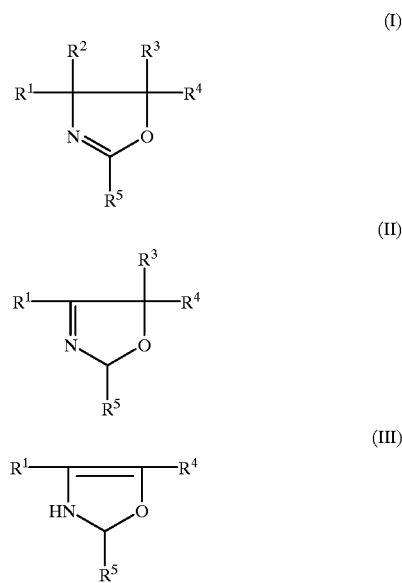

wherein $R^1$, $R^2$, $R^3$ and $R^4$ are independently a hydrogen atom, a halogen atom, an alkyl group, an aralkyl group, a phenyl group or a substituted phenyl group; and $R^5$ is an acyclic organic group having an addition-polymerizable unsaturated bond.

The above-mentioned polymers may be dissolved in a mixed solvent of water and a water-soluble organic solvent upon use. Also, since the polymers ordinarily contain no emulsifying agent, it becomes possible to exhibit sufficient water resistance and solvent resistance due to the cross-linking by the oxazoline groups.

As the halogen atoms as substituents of the addition-polymerizable oxazolines (a), there may usually exemplified a fluorine atom, a chlorine atom, a bromine atom or an iodine atom. Among them, chlorine atom and bromine atom are preferred. As the alkyl groups, there may be exemplified methyl, ethyl, n-propyl, isopropyl, n-butyl, isobutyl, pentyl, hexyl or the like. As the aralkyl groups, there may be exemplified aralkyl groups whose alkyl chains have 1 to 5 carbon atoms, e.g., benzyl, phenetyl, benzhydryl, naphthyl-methyl or the like. As the substituted phenyl groups, there may be exemplified chlorophenyl, bromophenyl, methoxyphenyl, ethoxyphenyl, methylaminophenyl, ethylaminophenyl, dimethylaminophenyl, methylethylaminophenyl, diethylaminophenyl or the like. As the acyclic organic groups having an addition-polymerizable unsaturated bond, there may be exemplified vinyl, isopropenyl or the like.

As the above-mentioned addition-polymerizable oxazolines (a), there may be exemplified 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline or the like. These oxazolines may be used singly or in the form of a mixture of any two or more thereof. Among these oxazolines, 2-isopropenyl-2-oxazoline is preferably used because this compound is readily available from the industrial viewpoint.

The above-mentioned monomers (b) are not restricted to particular ones. Any monomers can be used as long as the monomers can be copolymerized with the addition-polymerizable oxazolines (a). Examples of the monomers (b) may include methacrylic esters such as methyl methacrylate, butyl methacrylate or 2-ethylhexyl methacrylate; unsaturated carboxylic acids such as methacrylic acid, itaconic acid or maleic acid; unsaturated nitriles such as methacrylonitrile; unsaturated amides such as methacrylamide or N-methylolated methacrylamide; vinyl esters such as vinyl acetate or vinyl propionate; vinyl ethers such as methyl vinyl ether or ethyl vinyl ether; α-olefins such as ethylene or propylene; halogen-containing α-, β-unsaturated monomers such as vinyl chloride, vinylidene chloride or vinyl fluoride; α-, β-unsaturated aromatic monomers such as styrene or α-methyl styrene; or the like. These monomers may be used singly or in the form of a mixture of any two or more thereof.

As the polymerization method for producing the oxazoline group-containing water-soluble polymer, there may be exemplified a method of dissolving the addition-polymerizable oxazoline (a), at least one kind of the monomer (b) and if necessary, a polymerization initiator such as benzoyl peroxide or azo-bis-isobutylonitrile in a water-soluble organic solvent and then heating the resultant solution. Further, a water paint containing the oxazoline group-containing water-soluble polymer can be prepared by adding water to the above-obtained polymer solution and then heating the mixture to distill off a part or whole of the solvent. The polymerization of the water-soluble polymer may be carried out by an anionic polymerization method using n-butyl lithium, etc., as a catalyst.

As described hereinbefore, in accordance with the present invention, it is required that the content of the oxazoline group-containing water-soluble polymer in the resin composition constituting the coating layer is 6 to 80% by weight, preferably 10 to 80% by weight, more preferably 15 to 60% by weight. When the content of the oxazoline group-containing water-soluble polymer is less than 6% by weight, the polymer cannot be sufficiently cross-linked by the oxazoline groups. On the other hand, when the content of the oxazoline group-containing water-soluble polymer is more than 80% by weight, the resultant coating layer cannot exhibit sufficient hot water resistance and solvent resistance. Incidentally, the oxazoline group-containing water-soluble polymer contains the oxazoline groups in an amount of usually 0.4 to 5.0 mmol/g, especially 0.5 to 4.0 mmol/g. This correspondingly indicates that the content of the oxazoline group-containing water-soluble polymer in the resin composition constituting the coating layer is usually 10 to 80% by weight. However, when the oxazoline group content in the water-soluble polymer prepared is increased to about 8 to about 9 mmol/g, it becomes possible to reduce the content of the oxazoline group-containing water-soluble polymer in the coating layer to about 6% by weight.

The above-mentioned "water-compatible acrylic resin" means such resins containing alkyl acrylate and/or alkyl methacrylate as main components, more specifically water-soluble or water-dispersible resins containing alkyl acrylate and/or alkyl methacrylate in an amount of usually 40 to 95 mol %, and a vinyl monomer copolymerizable therewith and having functional groups in an amount of usually 5 to 60 mol %.

As the functional groups of the vinyl monomer, there may be exemplified a carboxyl group, acid anhydride groups, sulfonate groups or salts thereof, amide groups or alkylolated amide groups, an amino group including substituted amino groups, alkylolated amino groups or salts thereof, a hydroxyl group, an epoxy group or the like. Among them, carboxyl group, acid anhydride groups, epoxy group, etc., are preferred. Any two or more kinds of these groups may be contained in the resin.

When the content of alkyl acrylate and/or alkyl methacrylate in the water-compatible acrylic resin is adjusted to not less than 40 mol %, the coating property of the resin composition applied on the deposited film and the strength and anti-blocking property of the resultant coating layer may be enhanced. Further, when the content of alkyl acrylate and/or alkyl methacrylate in the water-compatible acrylic resin is adjusted to not more than 95 mol % and when not less than 5 mol % of a compound having specific functional groups as a copolymerizable component is introduced into the water-compatible acrylic resin, the water-solubility or water-dispersibility of the water-compatible acrylic resin can be enhanced, and such properties may be stably maintained for a long period of time. As a result, it becomes possible to increase the adhesion strength between the coating layer and the base polyester film, and further the reaction caused in the coating layer can improve mechanical strength, water resistance and chemical resistance of the coating layer.

As the alkyl groups of the alkyl acrylate and/or the alkyl methacrylate, there may be exemplified methyl, n-propyl, isopropyl, n-butyl, isobutyl, 2-ethylhexyl, lauryl, stearyl, cyclohexyl or the like. As the compounds having carboxyl group or acid anhydride groups, there may be exemplified acrylic acid, methacrylic acid, itaconic acid, maleic acid, alkali metal salts, alkali earth metal salts or ammonium salts of these acids, maleic anhydride or the like. As the compounds having sulfonate groups, there may be exemplified vinyl sulfonic acid, styrene sulfonic acid, metal salts, e.g., sodium salts, or ammonium salts of these sulfonic acids, or the like.

As the compounds having amide groups or alkylolated amide groups, there may be exemplified acrylamide, methacrylamide, N-methyl methacrylamide, methylolated acrylamide, methylolated methacrylamide, ureidovinyl ether, β-ureidoisobutyl vinyl ether, ureidoethyl acrylate or the like.

As the compounds having amino group, alkylolated amino groups or salts thereof, there may be exemplified diethylaminoethyl vinyl ether, 2-aminoethyl vinyl ether, 3-aminopropyl vinyl ether, 2-aminobutyl vinyl ether, dimethylaminoethyl methacrylate, dimethylaminoethyl vinyl ether, compounds obtained by methylolating amino groups of these compounds, quaternary ammonium compounds obtained by modifying amino groups of these compounds with halogenated alkyl, dimethyl sulfate, sultone, etc., or the like.

As the compounds having hydroxyl group, there may be exemplified β-hydroxyethyl acrylate, β-hydroxyethyl methacrylate, β-hydroxypropyl acrylate, β-hydroxypropyl methacrylate, β-hydroxyvinyl ether, 5-hydroxypentyl vinyl ether, 6-hydroxyhexyl vinyl ether, polyethylene glycol monoacrylate, polyethylene glycol monomethacrylate, polypropylene glycol monoacrylate,,polypropylene glycol monomethacrylate or the like. As the compounds having epoxy group, there may be exemplified glycidyl acrylate, glycidyl methacrylate or the like.

As the compounds used in combination with the above-mentioned compounds, there may be exemplified acrylonitrile, styrenes, butyl vinyl ether, monoalkyl or dialkyl maleate, monoalkyl or dialkyl fumarate, monoalkyl or dialkyl itaconate, methyl vinyl ketone, vinyl chloride, vinylidene chloride, vinyl acetate, vinyl pyridine, vinyl pyrrolidone, vinyl trimethoxysilane or the like.

As the above-mentioned water-compatible acrylic resin, any types of acrylic resins can be used. Among them, acrylic resins containing no emulsifying agent are preferably used.

This is because the water resistance of the oxazoline group-containing water-soluble polymer can be prevented from being adversely affected by an emulsifying agent.

Accordingly, as the water-compatible acrylic resins, there may also be used water-compatible acrylic resins of self-dispersing type which are produced by using a reactive emulsifying agent or water-compatible acrylic resins produced by using a high molecular weight surfactant. This is because the reacted emulsifying agent and the high molecular weight surfactant have no adverse influence on water resistance of the oxazoline group-containing water-soluble polymer.

The content of the water-compatible acrylic resin in the resin composition forming the coating layer is usually 10 to 80% by weight, preferably 20 to 60% by weight. When the content of the water-compatible acrylic resin is less than 10% by weight, there is a tendency that water resistance and solvent resistance cannot be sufficiently imparted to the resultant coating layer. On the other hand, when the content of the water-compatible acrylic resin is more than 80% by weight, the adhesion property of the coating layer to the deposited barrier layer tends to be deteriorated. It is preferred that the water-compatible acrylic resin be used together with water-compatible polyurethane-based resin as described in detail hereinafter.

The water-compatible acrylic resin acts to prevent the water resistance or solvent resistance of the oxazoline group-containing water-soluble polymer from being deteriorated. The reason therefor is considered as follows. That is, a coating film made of the acrylic resin has an effect of preventing the deposition of oligomers on a surface of polyethylene terephthalate. By such an effect of preventing the deposition of oligomers, the coating layer can be inhibited from being attacked by water or solvent which is penetrated into the barrier layer through its defective portions formed due to deposited oligomer masses. Therefore, it is considered that the use of the water-compatible acrylic resin enables the oxazoline group water-soluble polymer to exhibit sufficient water and solvent resistance.

The water-compatible polyurethane-based resins are not restricted to particular ones, but those resins containing no low molecular weight hydrophilic dispersant are preferably used. The "water-compatible polyurethane-based resins" mean water-soluble or water-dispersible polyurethane-based resins produced by reacting a polyhydroxy compound with a polyisocyanate compound by ordinary methods. Among them, water-compatible polyurethane-based resins containing carboxyl group or salts thereof (hereinafter referred to merely as "carboxyl group") are preferably used since these resins have a high affinity for water as a solvent.

As the polyhydroxy compounds, there may be exemplified polyethylene glycol, polypropylene glycol, polyethylene-propylene glycol, polytetramethylene glycol, hexamethylene glycol, tetramethylene glycol, 1,5-pentane diol, diethylene glycol, triethylene glycol, polycaprolactone, polyhexamethylene adipate, polyhexamethylene sebacate, polytetramethylene adipate, polytetramethylene sebacate, trimethylol propane, trimethylol ethane, pentaerythritol, glycerol or the like.

As the polyisocyanate compounds, there may be exemplified hexamethylene diisocyanate, diphenylmethane diisocyanate, tolylene diisocyanate, isophorone diisocyanate, an adduct of tolylene diisocyanate with trimethylol propane, an adduct of hexamethylene diisocyanate with trimethylol ethane, or the like.

The carboxyl groups can be readily introduced into side chains of polyurethane, for example, by using a carboxyl-containing polyhydroxy compound as one of raw polyhydroxy compounds upon the production of polyurethane or by reacting an unreacted isocyanate group of the polyurethane with hydroxyl-containing carboxylic acid or amino-containing carboxylic acid and then adding the reaction product to an alkaline aqueous solution while stirring at high speed to obtain a neutralized product.

As the carboxyl-containing polyhydroxy compounds, there may be exemplified dimethylol propionic acid, dimethylol acetic acid, dimethylol valerianic acid, bis-(ethylene glycol) trimellitate or the like. As the hydroxyl-containing carboxylic acids, there may be exemplified 3-hydroxy propionic acid, γ-hydroxy butyric acid, p-(2-hydroxyethyl) benzoic acid, malic acid or the like. Further, as the amino-containing carboxylic acids, there may be exemplified β-aminopropionic acid, γ-aminobutyric acid, p-aminobenzoic acid or the like.

The carboxyl groups of the water-compatible polyurethane-based resin may contain counter ions. As the counter ions, there may be exemplified usually monovalent ions, preferably amine-based onium ions such as a hydrogen ion or an ammonium ion.

The content of the water-compatible polyurethane-based resin in the resin composition constituting the coating layer is usually 10 to 70% by weight, preferably 20 to 50% by weight. When the content of the water-compatible polyurethane-based resin is less than 10% by weight, the overlying barrier layer tends to be peeled off together with the coating layer. On the other hand, when the content of the water-compatible polyurethane-based resin is more than 70% by weight, the water resistance of the coating layer tends to be deteriorated. The water-compatible polyurethane-based resin is preferably used in combination with the water-compatible acrylic resin.

The coating layer according to the present invention may further contain a water-compatible polyester-based resin in addition to the above-mentioned oxazoline group-containing water-soluble polymer, water-compatible acrylic resin and water-compatible polyurethane-based resin. The water-compatible polyester-based resin usable in the coating layer is not restricted to particular ones. As preferred water-compatible polyester-based resins, there may be used any of water-soluble or water-dispersible saturated or unsaturated polyesters containing no low molecular weight hydrophilic dispersant, etc.

As the dicarboxylic acid components of the saturated polyesters, there may be exemplified aromatic dicarboxylic acids such as terephthalic acid, isophthalic acid or 2,5-naphthalene dicarboxylic acid; aliphatic dicarboxylic acids such as adipic acid, azelaic acid or sebacic acid; oxycarboxylic acids such as oxybenzoic acid; or ester-forming derivatives of these acids. As the glycol components of the saturated polyesters, there may be exemplified aliphatic glycols such as ethylene glycol, 1,4-butane diol, diethylene glycol or triethylene glycol; alicyclic glycols such as 1,4-cyclohexane dimethanol; aromatic diols such as p-xylene diol; poly(oxyalkylene)glycols such as polyethylene glycol, polypropylene glycol or polytetramethylene glycol; or the like.

The above-mentioned saturated polyesters may have either a linear structure or a branched structure obtained when a three or more-valent ester-forming component is used.

On the other hand, as the unsaturated polyesters usable in the resin composition of the coating layer, there may be exemplified those described in (1) and (2) below.

(1) Unsaturated polyesters having copolymerizable unsaturated groups in a molecular skeleton constituting the resin, which are obtained by reacting a raw material having a copolymerizable unsaturated group with the other raw components, as described in Japanese Patent Publications (KOKOKU) Nos. 45-2201, 46-2050 and 44-7134, and Japanese Patent Applications Laid-Open (KOKAI) Nos. 48-78233 and 50-58123.

(2) Unsaturated polyesters obtained by producing a saturated polyester containing no copolymerizable unsaturated group and then adding to the thus produced saturated polyester, a vinyl-based monomer containing a vinyl group and a functional group having reactivity with carboxyl group or hydroxyl group of the saturated polyester.

As the vinyl-based monomers used for the production of the unsaturated polyesters (2), there may be exemplified epoxy group- and vinyl group-containing compounds such as glycidyl methacrylate; alkoxysilanol group- and vinyl group-containing compounds such as vinyl methoxy silane or methacryloxyethyl trimethoxysilane; acid anhydride group- and vinyl group-containing compounds such as maleic anhydride or tetrahydrofumaric anhydride; isocyanate group- and vinyl group-containing compounds such as 2-hydroxypropyl methacrylatehexamethylene diisocyanate adduct; or the like.

As the water-compatible polyester-based resins, those containing carboxyl groups are preferably used in order to enhance an affinity for water as a solvent. The carboxyl groups can be readily introduced into side chains of the saturated or unsaturated polyesters, for example, by a method of reacting a dioxane compound having a carboxyl group with polyester (Japanese Patent Application Laid-Open (KOKAI) No. 61-228030), a method of radically grafting unsaturated carboxylic acid to polyester (Japanese Patent Application Laid-Open (KOKAI) No. 62-225510), a method of reacting polyester with halogenoacetic acid to introduce substituents into an aromatic ring of the polyester (Japanese Patent Application Laid-Open (KOKAI) No. 62-225527), a method of reacting polyester with a polyvalent carboxylic acid anhydride compound (Japanese Patent Application Laid-Open (KOKAI) No. 62-240318), or the like.

The carboxyl groups of the water-compatible polyester-based resins may have counter ions. As such counter ions, there may be exemplified usually monovalent ions, preferably amine-based onium ions such as a hydrogen ion or an ammonium ion.

The content of the water-compatible polyester-based resin in the resin composition constituting the coating layer is usually 10 to 70% by weight, preferably 20 to 50% by weight. When the content of the water-compatible polyester-based resin is less than 10% by weight, the overlying barrier layer tends to be peeled off together with the coating layer. On the other hand, when the content of the water-compatible polyester-based resin is more than 70% by weight, the water resistance of the coating layer tends to be deteriorated.

A coating solution used for forming the coating layer according to the present invention, may also contain a cross-linking agent in order to improve a fixing property (blocking property), water resistance, solvent resistance and mechanical strength of the coating layer. Examples of the cross-linking agents may include epoxy-based compounds, methylolated or alkylolated urea-based, melamine-based, guanamine-based, acrylamide-based and polyamide-based compounds, aziridine compounds, blocked polyisocyanate compounds, silane-based coupling agents, titanium-based coupling agents, zircoaluminate-based coupling agents, peroxides, photoreactive vinyl compounds, photosensitive resins or the like. These cross-linking agents may be contained in the coating solution in such a small amount as not to deteriorate the adhesion property of the resultant coating layer. Especially, it is preferred to use an epoxy-based compound such as glycidyl acrylate or glycidyl methacrylate in combination with these cross-linking agents, because these compounds can be cross-linked with side chains such as carboxyl groups of the resin compound, so that the adhesion strength between the coating layer and the deposit layer can be enhanced.

Further, the coating solution used in the present invention may also contain inorganic particles in order to improve fixing and sliding properties of the resultant coating layer. Examples of the inorganic particles may include silica, silica sol, alumina, alumina sol, zirconium sol, kaolin, talc, calcium carbonate, titanium oxide, barium salts, carbon black, molybdenum sulfide, antimony oxide sol or the like. The coating solution may further contain, if required, antifoaming agents, coating property-modifying agents, thickening agents, anti-static agents, organic lubricants, organic polymer particles, antioxidants, ultraviolet light absorbing agents, foaming agents, dyes, pigments or the like.

The coating solution may be applied onto the base polyester film during the film-forming process by using a reverse roll coater, a gravure coater, a rod coater, an air doctor coater or other coating devices, as described in Yuji HARASAKI "Coating System", Maki Shoten, 1979. The coating layer may be formed after production of the film. However, the formation of the coating layer is preferably conducted during the film-forming process. In the case of biaxially stretched films, it is preferred that after the coating solution is applied onto a longitudinally uniaxially stretched film, the dried or undried coated film is further stretched in the transverse direction, followed by heat-treating the obtained biaxially stretched film.

The above-mentioned method can be especially preferably adopted, since the film-forming, coating and drying steps can be performed continuously, thereby obtaining large merits as to production costs. The coating layer may be formed on one or both surfaces of the base polyester film. In the case where the base polyester film is provided on both surfaces thereof with coating layers, the coating layers may be the same as or different from each other. Incidentally, in order to improve coating and adhesion properties of the coating layer to the base polyester film, the surface of the base polyester film may be subjected to various treatments such as chemical treatment or electric discharge treatment before applying the coating solution thereto.

The thickness of the base plastic film is not particularly restricted, but usually 2 to 500 µm, preferably 5 to 200 µm. The thickness of the coating layer is usually 0.01 to 5 µm, preferably 0.02 to 1 µm. When the thickness is less than 0.01 µm, it tends to be difficult to obtain a uniform coating layer. On the other hand, when the thickness is more than 5 µm, there is a tendency that the coating layer is deteriorated in its sliding property so that the resultant film becomes difficult to handle.

The thus-formed coating layer has preferably a water droplet contact angle of not less than 60°. In general, a coating layer made of water-soluble resin containing large amounts of emulsifying agents, hydrophilic compounds or hydrophilic groups tends to have a reduced water-droplet contact angle, resulting in deteriorating its water-resistant adhesion property to the metal thin film deposited thereon. Therefore, care should be taken upon forming the coating layer so as to achieve the above-ranged water-droplet contact angle.

As the metals and/or metal oxides to be deposited on the coating layer according to the present invention, there may be exemplified aluminum, silicon, magnesium, palladium, zinc, tin, silver, copper, gold, indium, stainless steel, chromium, titanium, oxides of these metals or mixtures of these metals or metal oxides. As the method of depositing these metals or metal oxides, there may be generally used a vacuum deposition method. In addition, the deposition of the metals and/or metal oxides may be carried out by ion-plating method, sputtering method, CVD method or the like. The metal and/or metal oxide layer deposited on the coating layer may have an appropriate thickness according to final applications thereof. The thickness of the deposit layer is usually 5 to 500 nm, preferably 10 to 200 nm. Incidentally, in order to impart an adhesion property, specifically water-resistant adhesion property, or scuff resistance to the deposited film, a protective resin layer may be formed on the deposit layer.

As described above, in accordance with the present invention, there can be provided an industrially valuable deposited plastic film which is excellent in adhesion between a base film and a deposit layer, and excellent in a gas-barrier property, specifically gas-barrier property after boiling treatment or printing.

EXAMPLES

The present invention is described in more detail with reference to the following examples, but the present invention is not restricted to those examples and various modifications are possible within the scope of the invention. Various properties of deposited plastic films obtained in Examples and Comparative Examples were evaluated by the following methods.

(1) Adhesion property

On a surface of a deposit layer of a deposited film, a polyester film having the same thickness as that of a base polyester film of the deposited film was laminated by an ordinary dry-laminating method, followed by allowing the resultant laminated film to be aged. The obtained laminated film was cut into a strip having a width of 15 mm. The polyester film of the strip was partially peeled off at an end portion thereof and subjected to T-peel test in which the peeled end portion of the polyester film was further peeled off from the strip at a rate of 100 mm/min using a peel tester.

The adhesion property of the deposited film was evaluated by the following ratings.

A: Not less than 200 g

B: Between not less than 100 g and less than 200 g

C: Less than 100 g (2) Water droplet contact angle

A sample of a base film on which no deposit layer was formed, was measured with respect to a contact angle between the film surface to be deposited and a droplet of distilled water, at 23° C. and 50% RH (relative humidity) using a goniometer ("CA-DT-A Model Goniometer" manufactured by KYOWA SURFACE CHEMISTRY CO., LTD.). Three samples were subjected to the contact angle measurement in such a manner that the contact angles were measured at two positions on right and left sides of each sample, thereby obtaining six measured values in total. The average of the six measured values was calculated to determine a contact angle of the film tested. Incidentally, the water droplet contacted with the surface of each film had a diameter of 2 mm, and the contact angle therebetween was measured one minute after dropping.

(3) Gas-barrier property (a) Water vapor permeability:

A sample of a deposited film was measured with respect to water vapor permeability, at 40° C. and 90% RH using a water vapor permeability measuring device ("W-1 Type Permeability Tester" manufactured by MODERN CONTROLS CORP.). The water vapor permeability (g/m$^2 \cdot$24 hours) of the deposited film was evaluated according to the following ratings.

A: Less than 1

B: Between not less than 1 and less than 2

C: Not less than 2

(b) Oxygen permeability

Three different types of sample films, i.e., Sample I having a deposit layer; Sample II further having on the deposit layer, a 2 mm-thick printed layer made of gravure ink ("NEW LP SUPER-WHITE" produced by Toyo Ink Manufacturing CO., LTD.); and Sample III obtained by subjecting the Sample II to boiling treatment (90° C., 30 minutes), were used to measure an oxygen permeability thereof.

The oxygen permeability (cc/m$^2 \cdot$24 hours$\cdot$atm) of each sample film was measured at 30° C. and 90% RH using an oxygen permeability measuring device ("OX-TRN100 Type O$_2$ Permeability Tester" manufactured by MODERN CONTROLS CORP.). The oxygen permeability of each film were evaluated according to the following ratings.

A: Less than 1

B: Between not less than 1 and less than 10

C: Not less than 10

Examples 1 to 8 and Comparative Examples 1 to 6

Polyethylene terephthalate containing 50% by weight of reclaimed polyethylene terephthalate and having an intrinsic viscosity of 0.62 was extruded at 280 to 300° C. through an extrusion die, and cast on a cooling drum by an electrostatic pinning method, thereby obtaining an amorphous polyester sheet having a thickness of about 150 μm. The thus obtained polyester sheet was stretched at 95° C. to 3.5 times in the longitudinal direction. Thereafter, aqueous coating solutions having resin compositions shown in Tables 1 and 2 and mixing ratios shown in Table 3, was applied onto one surface of the longitudinally stretched film. The coated film was further stretched at 110° C. to 3.5 times in the transverse direction and then heat-treated at 230° C., thereby obtaining a 12 μm-thick biaxially stretched polyester film as a base film on which a coating layer having a thickness of 0.1 μm was formed. Next, a silicon oxide layer having a thickness of 500 Å was deposited on the coated surface of the polyester film. The resultant deposited polyester film was evaluated with respect to adhesion property, water droplet contact angle, water vapor permeability and oxygen permeability thereof in the above-mentioned manners. The results are shown in Table 3.

TABLE 1

| Kind of resin | Coating resin composition |
|---|---|
| A | Aqueous solution containing 40% by weight of oxazoline group-containing water-soluble polymer (content of oxazoline groups: 4.5 mmol/g; Volume ratio of water to 1-methoxy-2-isopropanol: 1:2) Resin used: "EPOCROSS WS-500" produced by NIHON CATALYST CO., LTD. |

TABLE 1-continued

| Kind of resin | Coating resin composition |
|---|---|
| B | Water dispersion containing oxazoline group-containing water-insoluble polymer (content of oxazoline groups: 0.9 mmol/g) Resin used: "EPOCROSS K1020" produced by NIHON CATALYST CO., LTD. |
| C | Water paint containing a water-compatible acrylic resin (non-emulsion type) produced in the following manner: That is, a mixture of 40 parts by weight of ethyl acrylate, 30 parts by weight of methyl methacrylate, 20 parts by weight of methacrylic acid and 10 parts by weight of glycidyl methacrylate was subjected to solution polymerization in ethyl alcohol. After completion of the polymerization, the reaction solution was heated while adding water thereto, to distill off ethyl alcohol therefrom. The pH of the resultant product was adjusted to 7.5 by adding ammonia water thereto, thereby obtaining a water paint containing a water-compatible acrylic resin (non-emulsion type). |

TABLE 2

| Kind of resin | Coating resin composition |
|---|---|
| D | Water paint containing a water-compatible acrylic resin (emulsion type) produced in the following manner: That is, a mixture of 40 parts by weight of ethyl acrylate, 30 parts by weight of methyl methacrylate, 20 parts by weight of methacrylic acid, 10 parts by weight of glycidyl methacrylate and one part by weight of sodium dodecyl benzene-sulfonate as an emulsifying agent was subjected to emulsion polymerization in water as a solvent. The pH of the resultant product was adjusted to 7.5 by adding ammonia water thereto, thereby obtaining a water paint containing a water-compatible acrylic resin (emulsion type). |
| E | Water paint containing a water-compatible polyurethane-based resin produced in the following manner: That is, 664 parts of terephthalic acid, 631 parts of isophthalic acid, 472 parts of 1,4-butane diol and 447 parts of neopentyl glycol were reacted with each other to obtain polyester polyol. Next, 321 parts of adipic acid and 268 parts of dimethylol propionic acid were added to the thus obtained polyester polyol, thereby obtaining pendant carboxyl group-containing polyester polyol A. Further, 160 parts of hexamethylene diisocyanate was added to 1880 parts of the polyester polyol A, thereby obtaining a water paint containing a water-compatible polyurethane-based resin. |
| F | Water paint containing a water-compatible polyurethane-based resin Resin used: "POLYESTER-WR-961" produced by NIHON GOSEI KAGAKU KOGYO CO., LTD. |

TABLE 3

| Examples and Comparative Examples | Mixing percentage (wt. %) | | | | | |
|---|---|---|---|---|---|---|
| | Resin A | Resin B | Resin C | Resin D | Resin E | Resin F |
| Example 1 | 60 | — | 20 | — | 20 | — |
| Example 2 | 40 | — | 40 | — | 20 | — |
| Example 3 | 20 | — | 40 | — | 40 | — |
| Example 4 | 10 | — | 50 | — | 40 | — |
| Example 5 | 20 | — | 80 | — | — | — |
| Example 6 | 30 | — | — | — | 70 | — |
| Example 7 | 20 | — | — | 40 | 40 | — |
| Example 8 | 20 | — | 40 | — | — | 40 |
| Comparative Example 1 | 5 | — | 85 | — | 10 | — |
| Comparative Example 2 | 5 | — | 10 | — | 85 | — |
| Comparative Example 3 | — | — | 40 | — | 40 | 20 |
| Comparative Example 4 | — | — | — | — | 70 | 30 |
| Comparative Example 5 | — | 20 | 40 | — | 40 | — |
| Comparative Example 6 | — | — | — | — | — | — |

| Examples and Comparative Examples | Adhesion property | Gas-barrier property | | | | Contact angle (°) |
|---|---|---|---|---|---|---|
| | | water vapor permeability | Oxygen permeability | | | |
| | | | After deposition | After boiling | After printing | |
| Example 1 | A | A | A | A | A | 73 |
| Example 2 | A | A | A | A | A | 73 |
| Example 3 | A | A | A | A | A | 75 |
| Example 4 | A | A | A | A | A | 71 |
| Example 5 | B | A | A | B | B | 85 |
| Example 6 | A | A | A | B | B | 70 |
| Example 7 | B | A | A | B | B | 65 |
| Example 8 | A | A | A | B | A | 65 |
| Comparative Example 1 | C | A | A | C | B | 83 |
| Comparative Example 2 | A | A | A | C | A | 61 |
| Comparative Example 3 | A | A | A | C | C | 56 |
| Comparative Example 4 | A | B | B | C | C | 58 |
| Comparative Example 5 | A | A | A | C | B | 70 |
| Comparative Example 6 | C | B | B | C | C | 74 |

Example 9 and Comparative Example 7

Nylon 6 containing 50% by weight of reclaimed nylon 6 was extruded at 230° C. through a T die of an extruder, and the extruded resin was rapidly cooled on a cooling drum, thereby obtaining an unstretched nylon sheet having a thickness of 144 μm. The thus obtained sheet was stretched at 60° C. in the longitudinal direction such that the stretch ratio became 3 times. Thereafter, aqueous coating solutions having resin compositions and mixing percentages shown in Table 4, was applied onto one surface of the longitudinally stretched film. The coated film was further stretched at 90° C. in the transverse direction such that the stretch ratio became 3 times, and then heat-treated at 205° C., thereby obtaining a 16 μm-thick biaxially stretched nylon film. Next, a silicon oxide-deposited layer was formed on the nylon film in the same manner as in Example 1. The deposited nylon film was laminated through an adhesive on an L-LDPE film having a thickness of 50 μm. The adhesion property and gas-barrier property of the resultant laminated film and the water droplet contact angle of the deposited film were evaluated in the same manner as in Example 1. The results are shown in Table 4.

Example 10 and Comparative Example 8

Polypropylene containing 50% by weight of reclaimed polypropylene was extruded at 210° C. through a T die of an extruder, and the extruded resin was rapidly cooled on a cooling drum, thereby obtaining an unstretched polypropylene sheet having a thickness of 1 mm. The thus obtained sheet was stretched at 150° C. in the longitudinal direction such that the stretch ratio became 5 times. Thereafter, aqueous coating solutions having resin compositions and mixing percentages shown in Table 4, was applied onto one surface of the longitudinally stretched film. The coated film was further stretched at 155° C. in the transverse direction such that the stretch ratio became 10 times, and then heat-treated at 160° C., thereby obtaining a 20 μm-thick biaxially stretched polypropylene film. Next, a silicon oxide-deposited layer was formed on the polypropylene film in the same manner as in Example 1. The deposited polypropylene film was laminated through an adhesive on an L-LDPE film having a thickness of 50 μm. The adhesion property and gas-barrier property of the resultant laminated film and the water droplet contact angle of the deposited film were evaluated in the same manner as in Example 1. The results are shown in Table 4.

TABLE 4

| Examples and Comparative Examples | Mixing percentage (wt. %) | | | | | |
|---|---|---|---|---|---|---|
| | Resin A | Resin B | Resin C | Resin D | Resin E | Resin F |
| Example 9 | 60 | — | 20 | — | 20 | — |
| Comparative Example 7 | — | — | — | — | — | — |
| Example 10 | 60 | — | 20 | — | 20 | — |
| Comparative Example 8 | — | — | — | — | — | — |

| Examples and Comparative Examples | Adhesion property | water vapor permeability | Oxygen permeability | | | Contact angle (°) |
|---|---|---|---|---|---|---|
| | | | After deposition | After boiling | After printing | |
| Example 9 | A | A | A | B | A | 75 |
| Comparative Example 7 | B | B | B | C | C | 80 |
| Example 10 | A | A | A | B | A | 72 |
| Comparative Example 8 | C | C | C | C | C | 30 |

What is claimed is:

1. A process for producing a deposited plastic film which comprises:

a plastic film;

a coating layer which is formed on at least one surface of said plastic film and comprises a cured resin composition obtained by curing a resin composition consisting essentially of 10 to 80% by weight of an oxazoline group-containing water-soluble polymer and at least one resin selected from the group consisting of a water-soluble or water dispersible acrylic resin, a water-soluble or water-dispersible polyurethane resin and a water-soluble or water-dispersible polyester resin; and a deposit layer which comprises a metal, metal oxide or mixture thereof and being formed on a surface of said coating layer;

which process comprises:

obtaining an amorphous sheet;

stretching said amorphous sheet in longitudinal direction;

applying the resin composition for forming said coating layer on said longitudinally stretched film;

stretching said coating layer in transverse direction to obtain a biaxially stretched film;

heat-treating said biaxially stretched film; and applying the deposit layer on the surface of the coating layer.

2. The process according to claim 1, wherein the content of oxazoline groups in said oxazoline group-containing water-soluble polymer is 0.4 to 5.0 mmol/g.

3. The process according to claim 1, wherein said resin composition to be cured comprises 10 to 80% by weight of an oxazoline group-containing water-soluble polymer, 10 to 80% by weight of a water-soluble or water-dispersible acrylic resin and 10 to 70% by weight of a water-soluble or water-dispersible polyurethane-based resin.

4. The process according to claim 1, wherein the plastic film comprises polyester.

5. The process according to claim 1, wherein said plastic film comprises polypropylene, polyamides, polyvinyl alcohol or a partially hydrolyzed product of ethylene-vinyl acetate copolymer.

6. The process according to claim 1, wherein said coating layer is stretched in at least one direction after a coating solution for forming said coating layer is applied on said plastic film.

7. The process according to claim 1, wherein the water droplet contact angle of said contact layer is not less than 60°.

8. A deposited plastic film produced by the process as defined in claim 2.

9. A deposited plastic film produced by the process as defined in claim 3.

10. A process for producing a deposited plastic film which comprises:

obtaining a plastic film;

stretching the plastic film in a longitudinal direction;

forming a resin composition consisting essentially of 10 to 80% by weight of an oxazoline group-containing water-soluble polymer and at least one resin selected from the group consisting of a water-soluble or water dispersible acrylic resin, a water-soluble or water-dispersible polyurethane resin and a water-soluble or water-dispersible polyester resin;

applying the resin composition on the longitudinally stretched film to form a coating layer;

stretching the coating layer in transverse direction to obtain a biaxially stretched film;

heat-treating the biaxially stretched film; and applying a deposit layer which comprises a metal, metal oxide or mixture thereof on a surface of the coating layer.

* * * * *